Jan. 14, 1958 A. FINLAY 2,820,097

APPARATUS FOR CARRIER INTERCOMMUNICATION SYSTEMS

Filed Aug. 29, 1952 3 Sheets-Sheet 1

INVENTOR.
Alexander Finlay
BY W. L. Stout.
HIS ATTORNEY

Jan. 14, 1958 A. FINLAY 2,820,097

APPARATUS FOR CARRIER INTERCOMMUNICATION SYSTEMS

Filed Aug. 29, 1952 3 Sheets-Sheet 2

INVENTOR.

*Alexander Finlay*

BY W. L. Stout.

HIS ATTORNEY

Jan. 14, 1958 A. FINLAY 2,820,097

APPARATUS FOR CARRIER INTERCOMMUNICATION SYSTEMS

Filed Aug. 29, 1952 3 Sheets-Sheet 3

INVENTOR.
Alexander Finlay
BY W. L. Stout.
HIS ATTORNEY

United States Patent Office 2,820,097
Patented Jan. 14, 1958

2,820,097

APPARATUS FOR CARRIER INTERCOMMUNICATION SYSTEMS

Alexander Finlay, Swissvale, Pa., assignor to Westinghouse Air Brake Company, Wilmerding, Pa., a corporation of Pennsylvania Application August 29, 1952, Serial No. 307,026

9 Claims. (Cl. 179—2.5)

My invention relates to apparatus for carrier intercommunication systems and particularly to apparatus for two-way carrier telephone systems where any station of a group of stations can talk with all the other stations.

Carrier telephone systems have generally been used to provide communication between two fixed points. At many places, such as on railroads, for example, voice frequency telephone circuits have been used widely on a party line basis for communication between a group of stations spaced along the railroad. That is, in these party line systems many stations are connected to the same line circuit and a special station selection and calling arrangement is provided. Frequently on railroads additional telephone facilities are needed and a metallic line circuit for a party line system between a group of stations is not available.

Furthermore, when a large number of spaced stations are involved in a communication system, the distance between the stations may vary from a fraction of a mile to many miles and the strength of the current received at a station may vary over wide limits due to the different distances the current is transmitted. Hence, where many stations are involved, it is desirable to incorporate in the telephone apparatus of a station some means for keeping the energy level of the output current substantially constant over a wide variation in the energy level of the current received. Again, in intercommunication systems it is desirable where each station is always ready to receive and a loud-speaker is employed, to use the loud-speaker as a calling device because this greatly facilitates station calling and simplifies the equipment. Again, when a number of stations are connected to a line circuit with each station ready to receive, the input circuit at each station must be such that it causes a negligible load at the communication current used. Furthermore, when many stations are involved, the layout at the different stations will vary and it is desirable that the communication apparatus be flexible enough to permit different arrangements in the position and location of the different devices.

In view of the foregoing problems in providing an intercommunication system for a group of spaced stations, an object of my invention is the provision of novel and improved carrier telephone apparatus which enables each station of a group of spaced stations to communicate with all the other stations.

Another object of my invention is the provision of improved carrier telephone apparatus which enables each station of a group of spaced stations to use a loud-speaker as a calling device.

Again, an object of my invention is the provision of improved carrier telephone apparatus for a plurality of stations connected by a line circuit wherewith each station apparatus causes only a negligible load on the line circuit and transmission losses in the communication current are minimized.

Another object of my invention is the provision of carrier telephone apparatus for an intercommunication system incorporating improved means whereby the audio output energy level of a station apparatus is maintained substantially constant over a relatively wide range in the strength of the current received at the station.

A further object and feature of my invention is the provision of carrier telephone receiving apparatus incorporating improved means for providing at a single stage of amplification a gain control adequate to assure a substantially constant value of output current over a wide range in the strength of the input current.

Again, a feature of my invention is the provision of modulated carrier receiving apparatus incorporating improved automatic gain control means which is somewhat nonlinear so that the direct current controlling voltage will more nearly produce a constant voltage output for a variable mu amplifier tube.

A further feature of my invention is the provision of improved carrier telephone apparatus operable to provide two-way communication on a push-to-talk basis and which apparatus has a relatively simple switching means and the different elements may be arranged as best suited for the station layout.

Other features, objects and advantages of my invention will appear as the specification progresses.

The foregoing objects, features and advantages of my invention I attain by the provision of a novel circuit connection at each station of a carrier intercommunication system. These circuit connections are conected in parallel across a pair of line wires extending between the stations and each circuit connection includes an input and an output filter with switching means having contacts operable to exclude the output filter during noncommunication periods and during receiving periods. The input filter of each station connection is permanently connected across the line wires and hence each station is ready to receive and any station can take control of the line circuit and communicate with all of the other stations. Thus at each station a loud-speaker may be used as a calling means and special station selection and calling devices are not required. Each input filter is provided with tuned circuits selected to provide a desired circuit Q and the first tuned circuit is made to include the losses of a resistor. With the line circuit here involved this resistor is in effect in parallel with the receiving apparatus, but as far as voltages across the line wires are concerned, the input circuit of the apparatus consists of the selected resistance in series with the first tuned circuit. Consequently the impedance of the station circuit connection is never less than that of the resistor and can be made relatively high so that each station connection presents a negligible load at the carrier frequency used.

Furthermore, the receiving portion of each apparatus is provided with an auxiliary or separate channel which includes an amplifier and a rectifier characterized to provide a bias or control voltage which will provide an adequate gain control with only one stage of variable $\mu$ amplifier tube. Also, this control voltage channel is made somewhat nonlinear as to the direct current controlling voltage so that this voltage will have a characteristic which tends to produce a more nearly constant energy output for the variable $\mu$ amplifier tube. Again, each station apparatus is provided with a plug connector for a terminal panel and with a switching or directional control means, which enables the loud-speaker, microphone, push-to-talk device and power unit to be located as best suited for the station.

I shall describe one form of apparatus embodying my invention and shall then point out the novel features thereof in claims.

In the accompanying drawings, Fig. 1 is a diagrammatic view showing in block form a general arrangement of one form of apparatus embodying my invention.

In each of the several views like reference characters are used to designate similar parts.

Figure 1:
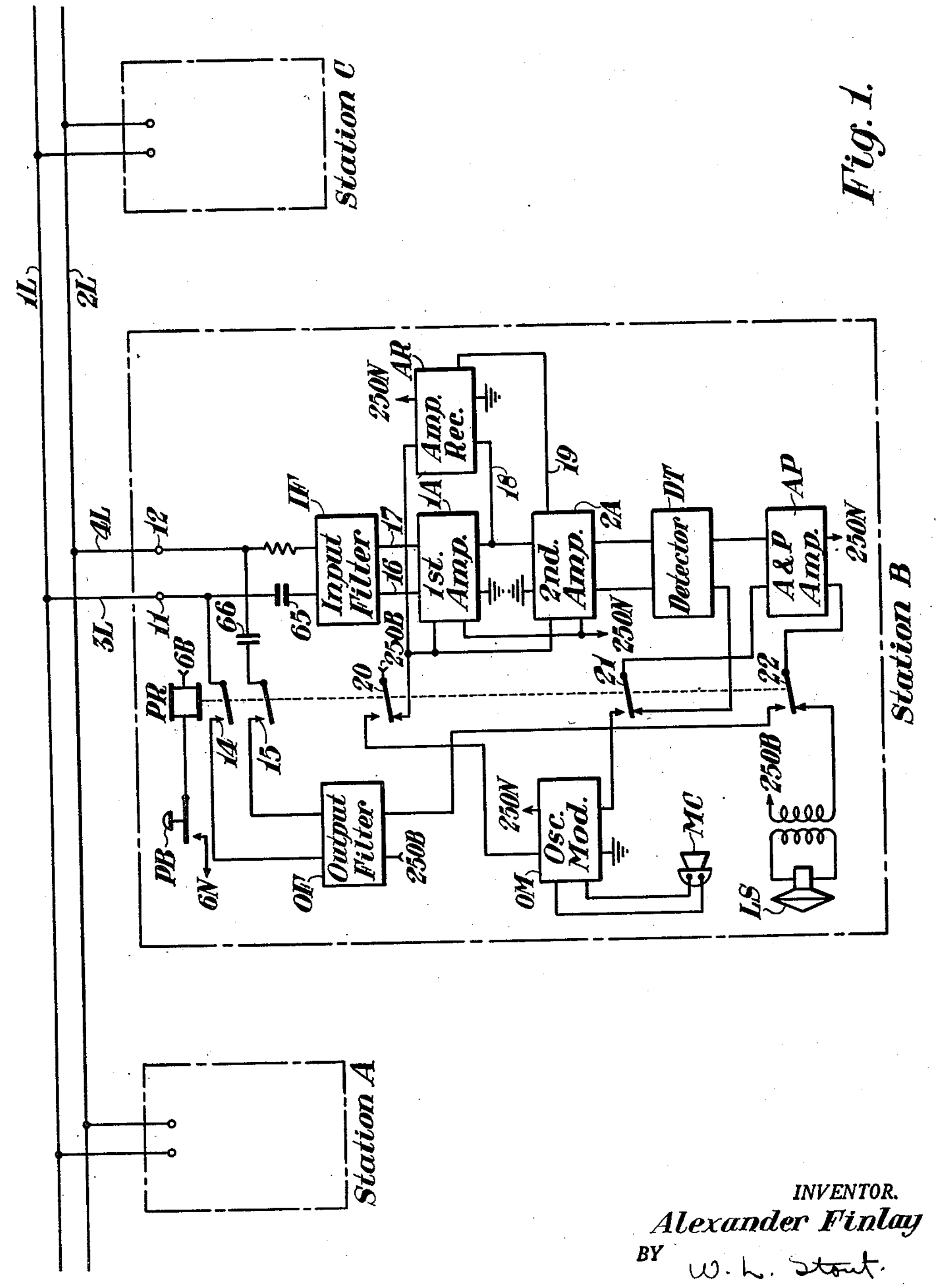

In Fig. 1, the reference characters 1L and 2L designate a pair of line wires which extend between a group of spaced stations, of which group only the three stations A, B, and C are shown. It is to be understood that these line wires 1L and 2L may extend to a much larger number of wayside stations and that these different stations are spaced according to the territory along which they are located with some stations being close together and with a relatively long distance between other stations. This pair of line wires 1L and 2L serve as a line circuit which is adapted to transmit a modulated carrier communication current and as an aid in understanding the invention I shall assume for illustration that a carrier of the order of 35 kc. is provided and the carrier is amplitude modulated at voice frequencies for telephone communication, the voice frequency range of the order of 300 to 4000 cycles per second being used. It will be understood, however, that the invention is not limited to this carrier frequency or to this modulation frequency range and other carriers and other modulation frequency ranges can be used and in fact other forms of modulation can be used. This line circuit 1L—2L may be an existing line circuit which is used for telegraph or some similar service and is used for transmission of the carrier telephone current as an additional facility. This line circuit 1L—2L extending between the several stations is provided with a circuit connection at each of the stations, the circuit connections being connected across the line circuit in parallel. For example, at the station B there is provided a circuit connection which includes wires 3L and 4L connecting terminals 11 and 12 of the station apparatus across the line wires 1L and 2L, respectively, and across which station terminals 11 and 12 an input filter IF and an output filter OF are connected in parallel. Preferably, a blocking capacitor 65 is interposed in the connection to the input filter IF and another blocking capacitor 66 is interposed in the connection to the output filter OF, these blocking capacitors being effective to block any direct current or low frequency current that may be applied to the line wires. Similarly, a circuit connection is provided at the stations A and C and at each of the other stations of the system, but the circuit connections at the stations A and C are not shown for the sake of simplicity since they would be a duplication of the arrangement provided at station B. It is clear from an inspection of Fig. 1 that the input filter IF of the circuit connection of station B is permanently connected across the line circuit, but that the output filter OF is connected across the line circuit only when a relay PR, to be referred to later, is picked up closing front contacts 14 and 15, which are interposed in the connection of the output filter across the terminals 11 and 12.

In Fig. 1, the carrier telephone apparatus for station B is shown in block form and the apparatus at each of the stations A and C is indicated conventionally by a dash and dot rectangle, the apparatus at stations A and C being shown conventionally since the apparatus at each of these stations, as well as the apparatus at all the other stations in the system, is a duplication of that shown for station B.

The apparatus of station B comprises a receiving portion which is commonly called a receiver and a transmitting portion which is commonly called a transmitter together with suitable sources of power and a directional control means. Preferably, the power source would be a direct current source adapted to supply a relatively high voltage suitable for the anode circuits of electron tubes of the apparatus and a relatively low voltage which would be suitable for the heater circuits of electron tubes and for control purposes. In the drawings, the reference characters 250B and 250N designate high voltage positive and negative terminals respectively, of a source of direct current, and the reference characters 6B and 6N designate the low voltage positive and negative terminals respectively of the source. As will appear hereinafter, the negative terminal of the source is connected to ground as is customary in apparatus of the type here involved. Furthermore, the heater circuits for the electron tubes to be referred to later are not shown for the sake of simplicity since such heater circuits would be according to standard practice and form no part of my invention, it being understood that where electron tubes are used the tubes are normally heated and in an active condition.

The receiving portion of the apparatus of station B includes a first amplifier stage 1A, a second amplifier stage 2A, a detector stage DT, an audio and power amplifier stage AP and a loud-speaker LS, this receiving apparatus being connected to the output side of the input filter IF by wires 16 and 17 and the different stages being arranged in cascade. The receiving portion of the apparatus also includes a gain control channel or means which comprises an amplifier-rectifier stage AR, the input side of which stage is coupled to the output of the first stage amplifier 1A by wire 18 and ground, this stage also having a control voltage connection including wire 19 to the second stage amplifier 2A. These elements of the receiving apparatus will be described more fully in connection with the apparatus of Fig. 2.

It is to be observed, however, that the receiving apparatus not only is permanently connected to the input filter which in turn is permanently connected to the connection to the line circuit but the receiving apparatus normally, that is during non-communication periods, is energized and active ready to receive any communication current that may be passed from the line circuit to the input filter IF. To this end, the high voltage power terminals 250B and 250N are connected to stages 1A, 2A and the gain control stage AR over a connection including back contact 20 of the directional relay PR, the output of the detector stage DT is connected to the input of the amplifier stage AP over back contact 21 of relay PR and the stage AP is connected to the power terminal 250B over a circuit including back contact 22 of the relay PR.

The transmitting portion of the apparatus comprises an oscillator-modulator stage OM, the stage AP used as a power amplifier, and a microphone MC. This transmitting apparatus will also be described more fully in connection with Fig. 2. It is to be pointed out, however, that the transmitter of station B is normally deenergized and inactive but that when directional relay PR is picked up closing front contacts 20, 21 and 22, the high voltage terminals of the power source are connected to the oscillator-modulator stage OM at front contact 20 of relay PR, the output of the oscillator-modulator OM is connected to the input of the power amplifier stage AP at front contact 21 of relay PR, and the stage AP is powered by a connection including front contact 22 of relay PR. Consequently the transmitter is energized and made active to supply a carrier telephone current when the relay PR is picked up. This directional relay PR is controlled by a simple circuit including the low voltage terminals of the power source and a push button PB, the push button PB being normally open so that the relay PR is normally deenergized and released and is energized and picked up when the push button PB is held closed.

Figure 2:
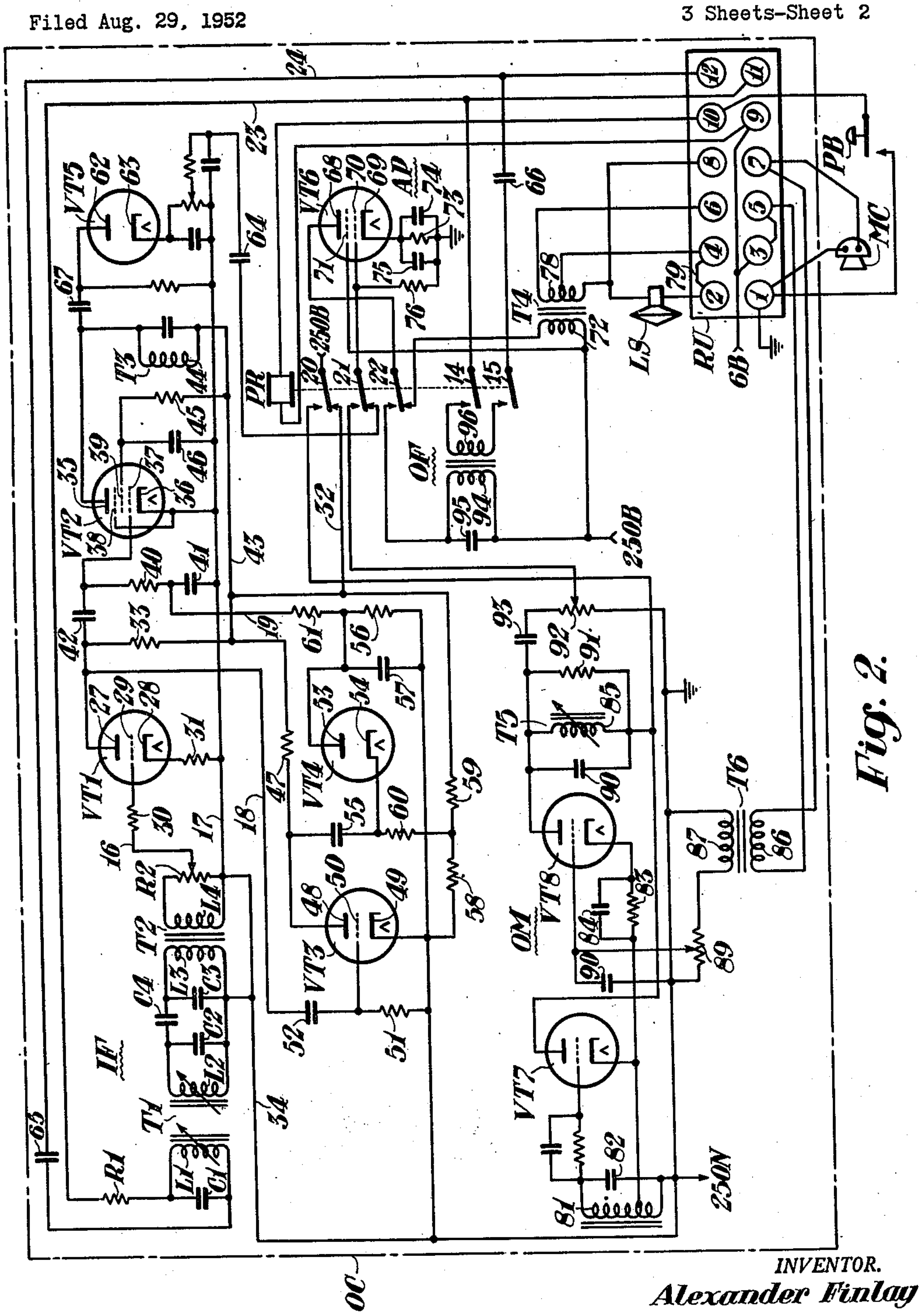
Fig. 2 is a schematic diagram showing the apparatus embodying my invention for a single station of Fig. 1.

Fig. 2 is a schematic diagram showing the apparatus illustrated in block form for station B of Fig. 1, and which apparatus is duplicated at each of the other stations of the system. The apparatus of Fig. 2 is preferably housed in a single case indicated by a dash and dot rectangle OC except for certain devices of the apparatus to be referred to hereinafter. Also this case OC would preferably house the power source which in the drawing is indicated by the reference characters designating the terminals of the source. Furthermore, this housing case OC would have mounted on one side thereof a plug unit of a plug connector, such as a receptacle unit, and which unit serves as a medium for connecting the apparatus with outside circuits and which enables various elements of the apparatus to be located as may be desirable at other points in the station. As shown, the receptacle unit is indicated by the reference character RU and is provided with twelve terminals indicated by the numerals 1 to 12, inclusive.

The terminals 11 and 12 of the unit RU correspond to the terminals 11 and 12 at station B of Fig. 1, and which terminals are adapted to be connected across the line wires 1L and 2L of the line circuit. In Fig. 2, wires 23 and 24 are connected to the terminals 11 and 12 inside of the case OC and across these wires are connected the input and output filters to be referred to shortly. In Fig. 2, the input filter comprises a resistor R1 and two transformers T1 and T2.

The transformer T1 consists of two tuned circuits one of which includes winding L1 and capacitor C1 and the other of which tuned circuits includes winding L2 and capacitor C2. These two tuned circuits are coupled to a selected degree by the mutual inductance of the windings L1 and L2 which are mounted on suitable magnetic cores. The second transformer T2 is provided with a primary winding L3 and a secondary winding L4, the winding L3 and capacitor C3 forming a tuned circuit which is coupled to the tuned circuits of the transformer T1 by capacitor C4. The windings L3 and L4 are designed for a desirable mutual inductance and the winding L4 is connected across a selectivity selecting resistor R2 of relatively high resistance. Looking at the diagram of the input filter shown at the lower portion of Fig. 3, the impedance of the line circuit 1L—2L here involved is represented by a resistor 26 and which impedance may be of the order of 500 ohms. That is, line circuits of the type here involved will normally have a characteristic impedance of the order of 500 ohms.

Figure 5:
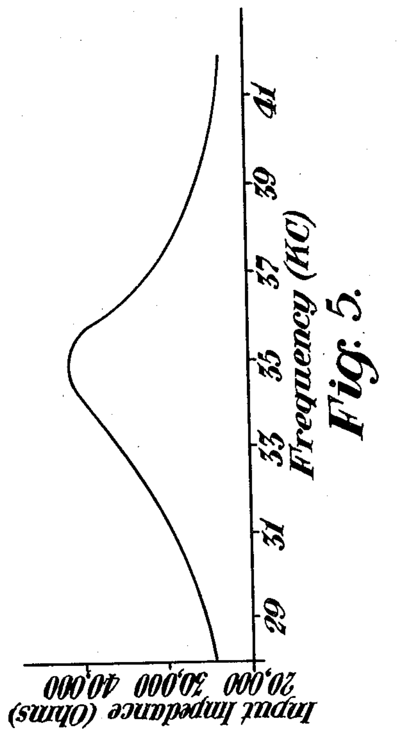
Fig. 5 is a graph showing input impedance characteristics of the apparatus of Fig. 2.
Figure 3:
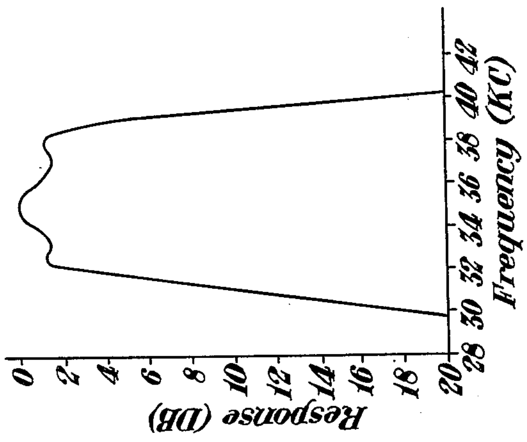
Fig. 3 is a graph showing an operating characteristic of the input filter of the apparatus of Fig. 2.
Figure 3:
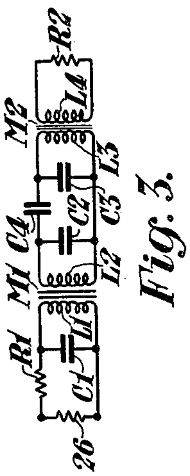

It is apparent from an inspection of the diagram of the input filter IF shown in Fig. 3, the resistor 26 which represents the line circuit impedance and the resistor R1 in series are in parallel with the tuned circuit L1—C1. In the design of the filter a certain circuit Q is desired and the tuned circuits and their mutual inductance which is indicated by the reference characters M1 and M2, are designed so that resistor R1 has a relative high resistance and a resistance many times the value of the line circuit impedance. Hence resistor R1 is effectively in parallel with the tuned circuits and in turn in parallel with the receiving apparatus. However, as far as voltages across the line circuit 1L—2L are concerned the input circuit of the receiving apparatus consists of the resistor R1 and the tuned circuit L1—C1 in series. This combination results in an input impedance which is never less than the resistance of resistor R1 and hence a resultant high input impedance so that the receiving apparatus represents a negligible load on the line circuit. Looking at the graph of Fig. 5, which illustrates the input impedance of a combination of elements found satisfactory and in which combination the resistor R1 is substantially 24,000 ohms, the total input impedance is of the order of 42,000 ohms at the carrier of 35 kc., this input impedance representing a negligible load on the line circuit. However, as illustrated by the graph of Fig. 3, this input filter provides a maximum response and a minimum loss in decibels (db) at the carrier of 35 kc.

Hence with the input filter here provided, when carrier modulated with voice frequencies is supplied across terminals 11 and 12 of the apparatus of Fig. 2, there will be created a corresponding voltage across resistor R2 in the output of the input filter IF.

The first stage amplifier of the apparatus includes an electron tube VT1, this tube being shown as a triode having an anode 27, a cathode 28 and a control grid 29, but other forms of tubes can be used. The input or control grid of tube VT1 is connected across a selected portion of resistor R2 by the connection including wires 16 and 17, a resistor 30 being interposed in the connection to grid 29 and resistor 31 being interposed in the cathode lead. The tube VT1 is provided with an anode circuit extending from the power terminal 250B through back contact 20 of the directional relay PR, wire 32, resistor 33, anode 27 and tube space to cathode 28, resistor 31 and wires 17 and 34 to the negative terminal 250N of the power source. Consequently, the modulated carrier communication voltage created across resistor R2 is amplified by the tube VT1 in the usual manner, the connection to the resistor R2 being adjusted so that the output of the first stage can be made as desired and also the overall sensitivity of the apparatus reduced when the line circuit is very noisy.

The second stage amplifier tube includes a pentode VT2 having an anode 35, a cathode 36, a control grid 37 and two additional grids 38 and 39. Obviously, other types of tubes can be used. The tube VT2 is provided with a control grid-cathode circuit including a resistor 40 and capacitor 41 in series and which circuit is coupled to the anode circuit of the first stage tube VT1 through capacitor 42. An anode circuit for the tube VT2 is provided from the positive terminal 250B, through back contact 20 of the relay PR, wires 32 and 43, winding 44 of an autotransformer T3, anode 35 and tube space to cathode 36 and wires 17 and 34 to the negative terminal of the current source. The grid 38 of this tube is connected to cathode 36 and the grid 39 is connected to the positive terminal of the power source through a resistor 45 and is provided with a by-pass capacitor 46. It follows that the second stage tube tends to further amplify the modulated carrier current passed by the first stage amplifier tube VT1.

The output of the first stage tube VT1 is also coupled to an auxiliary or gain control channel including an amplifier tube VT3 and a diode rectifier tube VT4. The tube VT3 is preferably a triode which is provided with an anode circuit extending from terminal 250B through back contact 20 of relay PR, wire 32, resistor 47, anode 48, tube space to cathode 49 and wire 34 to the negative terminal 250N. The control grid 50 of the tube VT3 is connected to cathode 49 through resistor 51 and is coupled to the anode 27 of the first stage tube VT1 through capacitor 52 and the connection 18. Hence the cathode 49 of tube VT3 is connected directly to the negative terminal of the current source and the control grid 50 is without a bias voltage. Thus, a portion of the modulated current in the output of the first stage tube VT1 is amplified by the tube VT3 of the gain control channel, the amplification being non-linear due to the non-bias of the tube. The output or anode circuit of the tube VT3 is coupled to anode 53 and cathode 54 of the diode VT4 through capacitor 55 and resistor 56, a by-pass capacitor 57 being connected across the resistor 56. Also, the cathode 54 of the diode is biased positive with respect to the anode 53 by a voltage derived from resistor 58 of a voltage divider consisting of resistors 58 and 59 in series connected across the power terminals 250B and 250N, the cathode 54 being connected to the junction terminal of resistors 58 and 59 through resistor 60. It is to be seen, therefore, that a rectified voltage is developed across the resistor 56 in response to the modulated carrier current applied to the gain control channel, but that the bias applied to the diode VT4 prevents the building up of the rectified voltage until a given strength of input current is reached. Beyond this given value of the input current, the rectified voltage across the resistor 56 is proportional to the strength of the input current. Hence, the non-linear arrangement here provided for the gain control channel assures a predetermined characteristic for the rectified voltage created across resistor 56. The rectified or unidirectional voltage created across resistor 56 is filtered and applied to the control grid circuit of the second stage amplifier tube VT2 through the connection 19 which includes resistor 61.

The second stage tube amplifier VT2 is a variable mu amplifier, that is, its control grid has a variable pitch, such tubes being well known and generally called variable mu tubes.

Because of this construction of the second stage tube VT2 and the construction and arrangement of the gain control channel, the direct control voltage applied to the control grid 37 of the second stage tube VT2 is such that the output current of the tube VT2 is relatively constant over a relatively wide variation in the strength of the received modulated carrier current.

Figure 4:
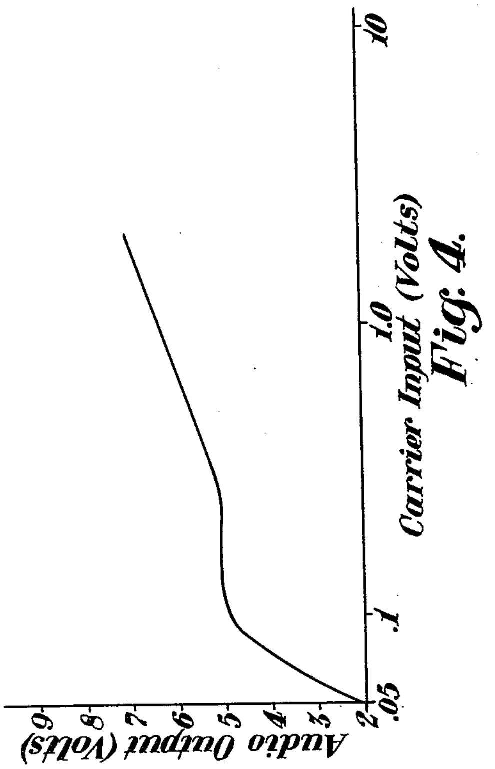
Fig. 4 is a graph showing a carrier input-audio output characteristic of the apparatus of Fig. 2.

The voltage developed across the transformer T3 in the output of the second stage amplifier is applied to a detector including a diode VT5 having an anode 62 and a cathode 63 and which is provided with the usual detector circuits, the detector being coupled to the output of tube VT2 through a capacitor 67. Hence the output voltage of the detector tube VT5 will be the modulation or audio frequency of the molulated carrier received and will be substantially constant in voltage due to the construction of the second stage tube VT2 and the construction and operating characteristics of the gain control channel. This characteristic of the apparatus here provided, wherewith a substantially constant audio output is obtained over a relatively wide range in the strength of the received modulated carrier, is shown in the graph of Fig. 4, the curve of Fig. 4 being plotted between modulated carrier voltage input and audio voltage output, the scale for the input volts being logarithmical. It is to be observed from this curve that for a normal range of .05 to 2.0 volts for the carrier input the voltage output of the detector ranges from substantially 2.1 to 7 volts. That is to say, that for a range of the order of 1 to 40 in the strength of the energy received a range of approximately 1 to 3.4 is effected in the audio voltage output.

The audio voltage output of detector VT5 is applied to the input of the audio or power amplifier stage AP, the connection including a capacitor 64 and back contact 21 of the relay PR. The amplifier AP includes a tetrode VT6 having an anode 68, a cathode 69, a control grid 70 and another grid 71. The anode circuit of this tube extends from the positive terminal 250B through winding 72 of a transformer T4, back contact 22 of relay PR, anode 68, tube space to cathode 69 and a biasing unit to ground, the unit consisting of a resistor 73 and two capacitors 74 and 75 in multiple. The control grid 70 is provided with a circuit consisting of resistor 76 and the biasing unit and is connected to the output of the detector through back contact 21 of relay PR as explained above. The other grid 71 is connected to the positive terminal of the power source in the usual manner. A secondary winding 78 of the transformer T4 is connected to the operating winding of a loud-speaker LS through terminals of the coupler unit RU, one terminal of the loud-speaker LS being connected to one outside terminal of winding 78 and which outside terminal is also connected to terminal 8 of the coupler unit RU. The other terminal of the loud-speaker is connected to terminal 2 of the coupler unit RU which in turn is connected to the mid terminal of winding 78 through jumper 79 and terminal 4 of the coupler unit. The loud-speaker LS is preferably mounted on one of the walls of the case OC, but it is clear that the loud-speaker LS or a second loud-speaker can be mounted in the station out-side of the case OC and connected to the winding 78 of the transformer T4 through the terminals 2, 4, 6 and 8 of the coupler unit RU.

The transmitting portion of the apparatus comprises a microphone MC, an oscillator-modulator stage OM and stage AP switched and used as a power amplifier stage. The oscillator-modulator OM includes an oscillator tube VT7 and a modulator tube VT8. The oscillator tube VT7 is a triode that is arranged as a well-known Hartley oscillator, as will be apparent from an inspection of the drawing. The oscillator is provided with an oscillatory circuit comprising an inductance 81 and a capacitance 82 which is tuned to supply a selected carrier frequency which as assumed hereinbefore for illustration may be 35 kc. It is to be pointed out that the tube VT7 is normally inactive and is energized and made active to supply its carrier frequency only when the relay PR is picked up and the anode circuit for the tube VT7 is completed at front contact 20 of relay PR. The oscillatory circuit is coupled to the control grid circuit of the tube VT8 through a unit including resistor 83 and capacitor 84 in multiple. Modulator tube VT8 is a triode and is provided with an anode-cathode circuit which includes a tuned circuit consisting of winding 85 of a transformer T5, a capacitor 90 and a resistor 91. The modulator is powered by the connection to terminal 250B over front contact 20 of the relay PR and the connection of the cathode of the tube to terminal 250N through the unit including resistor 83 and a portion of winding 81 of the oscillatory circuit. The resistor 83 has a value considerably higher in resistance than the usual cathode biasing resistor used for linear amplifiers and causes the tube VT8 to be biased near to anode current cutoff and to be operated in a nonlinear manner.

The microphone MC is located at a point where it will be convenient for the operator and it is connected to a microphone circuit through terminals of the receptacle unit RU. This microphone circuit extends from terminal 6B of the power source to terminal 3, jumper to terminal 5, winding 86 of a microphone transformer T6, terminal 7 of the unit RU, microphone MC, terminal 1 and to the negative terminal 6N of the power source through the ground path. The second winding 87 of the microphone transformer T6 is coupled to the control grid circuit of the modulator tube VT8 by being connected across a resistor 89 having an adjustable terminal connected to the control grid of that tube. It follows that when the tubes VT7 and VT8 are powered, the carrier frequency current generated by the tube VT7 is amplitude modulated by the voice frequencies created by speaking into the microphone MC. The amplifier stage AP is switched from the receiver to the transmitter and used as an output power amplifier during sending periods and to this end the control grid 70 of the tube VT6 is coupled to the output of the modulator tube VT8 over front contact 21 of relay PR and an adjustable resistor 92 and capacitor 93. When the relay PR is picked up closing front contact 22, the anode 68 of the tube VT6 is powered from the terminal 250B through a connection that includes winding 94 and capacitor 95 of the tuned circuit of the output filter OF. Since the modulator tube VT8 is operated in a nonlinear manner as explained hereinbefore, the anode current of that tube contains the product of the carrier voltage modulated by the voice frequency voltage. This modulation is selected by the tuned circuit 85—90 and amplified by the amplifier stage AP so that the modulated carrier current flows in the tuned circuit 94—95 of the output filter. A second winding 96 of the output filter OF is inductively coupled to the tuned circuit 94—95 and in turn is connected across the wires 23 and 24 of the station circuit connection through front contacts 14 and 15 of the directional relay PR. Consequently, when the relay PR is picked up so that the transmitter is made active and the input of the amplifier AP is coupled to the transmitter, the output of the amplifier AP is supplied to the station terminals 11 and 12 and in turn through the circuit connection to the line circuit, the receiver of this station being deenergized and made inactive during the sending period.

The directional relay PR which is preferably included in the housing case OC has its winding connected across terminals 9 and 10 of the coupling unit RU. A normally open push button PB would be located at a point in the station where it would be convenient for the operator to operate when using the microphone MC and one terminal of this push button is connected by a plug terminal to terminal 10 and the other terminal of the push button is connected to the negative terminal of the power source 6N through the ground terminal 1 of the unit RU. Thus when the push button PB is normal the relay PR is deenergized and is energized and picked up whenever the push button PB is closed.

In view of the foregoing description of the apparatus, it is to be seen that the receiver of each station apparatus has an input filter which is permanently connected to the line circuit and each receiver is normally energized and active ready to receive an incoming modulating carrier communication current. The transmitter of each station apparatus is normally deenergized and the output filter is disconnected from the line circuit.

The operator at any station wishing to communicate with a selected one of the other stations of the system would close his push button PB to pick up the directional relay PR of his apparatus and thereby switch the transmitter into an active condition and deenergize the receiver of that station. The operator would then speak into the microphone the station he desired to call and this call would be reproduced at the loud-speakers of all the stations. The operator at the calling station would then release the push button and restore his apparatus to the receiving condition. Following this, the operator at the station called would answer the call by closing his push button to condition his apparatus for sending. From this point on, the two stations would communicate on a push-to-talk basis. This conversation would be, of course, reproduced at all stations. At the end of this conversation any of the other stations could take control of the line circuit and communicate with any one or all of the other stations in a similar manner. Obviously, the output energy level of the loudspeaker of each station apparatus will be substantially constant regardless of the distance away the calling station may be due to the gain control provided for the second stage amplifier of the receiving apparatus. Furthermore, the input filter constructed in the manner described hereinbefore will cause a negligible load on the line circuit and the loss in the voltage of the communication current will be minimized.

Although I have herein shown and described but one form of apparatus for carrier intercommunication systems embodying my invention, it is to be understood that various changes and modifications may be made therein within the scope of the appended claims without departing from the spirit and scope of my invention.

Having thus described my invention, what I claim is:

1. In combination with a carrier telephone intercommunication system station, a transmitter including a microphone and an electron tube oscillator-modulator, a receiver including a first and a second amplifier stage and a detector stage in cascade, a loud-speaker, and a gain control voltage channel, the input of said gain control channel being coupled to the output of said first amplifier stage and the output of said gain control channel connected to the input of said second amplifier stage; an input filter having circuit elements tuned to resonance at a given carrier frequency and provided with input terminals which are adapted to be connected to a line circuit and output terminals which are coupled to said receiver, said tuned circuit elements having a circuit Q selected according to the frequency band of the telephone carrier current and a high impedance across the line circuit at said given carrier frequency, an output filter having circuit elements tuned to resonance at said given carrier frequency and provided with output terminals and input terminals, a power amplifier tube having input and output electrodes, a power source, a directional relay, circuit means including back contacts of said relay to connect the output of said detector stage to the input electrodes of said power amplifier tube and the output electrodes of said power amplifier tube to said loudspeaker; other circuit means including front contacts of said relay to connect output electrodes of said oscillator-modulator to the input electrodes of said power amplifier tube, the output electrodes of said power amplifier tube to the input terminals of said output filter and the output terminals of the output filter to a line circuit connection; and means including a push-to-talk device for controlling said relay.

2. In combination with a carrier telephone intercommunication system station, a transmitter including a microphone and an electron tube oscillator-modulator stage, a receiver including in cascade a first and a second electron tube amplifier and an electron tube detector, a loudspeaker, a gain control channel including an electron tube amplifier and a rectifier in cascade, means including capacitance to couple the input of the gain control channel to output electrodes of said first stage amplifier tube, means including a load resistor to connect the output of said gain control channel to input electrodes of said second stage amplifier tube, an input filter provided with input terminals connected to a line circuit connection and output terminals coupled to input electrodes of said first stage amplifier tube and including a resistor and at least one tuned circuit having inductance and capacitance tuned to resonance at a given carrier frequency, said resistor and said tuned circuit being connected in series across said input terminals and having a circuit Q selected according to the frequency band of the telephone carrier current and a high impedance at said given carrier frequency, an output filter having circuit elements tuned to resonance at said given carrier frequency and provided with input and output terminals, a power source, a directional relay, circuit means including back contacts of said relay to connect said power source to output electrodes of said first and second stage amplifier tubes and to output electrodes of said gain control amplifier tube and to couple said loudspeaker to the output of said detector tube, other circuit means including front contacts of said relay to connect said power source to output electrodes of said oscillator-modulator stage tubes and to couple the input terminals of said output filter to the output of said oscillator-modulator stage and to connect the output terminals of said output filter to a line circuit connection, and means including a push-to-talk device to control said relay.

3. In a receiver unit for a carrier telephone current carried by a line circuit and susceptible of a relatively wide variation, a first and a second amplifier stage and a detector connected in cascade, each said amplifier stage including an electron tube having input and output electrodes, filter means having connections to said input electrodes of said first stage tube, said filter comprising a resistor and at least a pair of tuned circuits having inductance and capacitance tuned to resonance at the frequency of said carrier, said resistor and a first one of said tuned circuits in series connected across said line circuit, said resistor and said tuned circuits having a circuit Q selected according to the frequency band of said carrier telephone current and said series connection of said resistor and said first tuned circuit having a high impedance at said carrier frequency to place a relatively small load on said line circuit, a gain control voltage channel including another amplifier tube and a rectifier, said other amplifier tube having input and output electrodes and having its output electrodes connected across a load resistor through said rectifier for creating a rectified voltage across said load resistor when carrier frequency energy is applied to the input electrodes of that tube, means including capacitance to couple the output electrodes of said first stage tube to the input electrodes of the tube of said second stage amplifier and to the input electrodes of said other amplifier tube, means including a source of direct voltage connected to the output electrodes of said other amplifier tube to bias that tube and provide a nonlinear characteristic for said gain control voltage channel, circuit means connecting said load resistor to the input electrodes of said second stage tube for controlling the gain of that tube by the rectified voltage created across said load resistor, said second stage tube characterized as a variable mu tube to provide a substantially constant energy level output over a relatively wide range in the energy level of said carrier telephone current due to the nonlinear characteristics of the said gain control voltage channel and of said second stage tube, a loud-speaker, and means to couple said loud-speaker to said detector.

4. In a receiver unit for a carrier telephone current carried by a line circuit and susceptible of a relatively wide variation, a first and a second amplifier stage and a detector connected in cascade, each said amplifier stage including an electron tube having input and output electrodes, filter means having connections to said input electrodes of said first stage tube, said filter means including a first and a second transformer and a first and a second resistor, said first transformer having a first and a second winding each of which windings is included with capacitance in a circuit tuned to resonance at the frequency of said carrier, said second transformer having a first winding which is included with capacitance in a circuit tuned to resonance at said carrier frequency and which is coupled by additional capacitance to said tuned circuit which includes said second winding of said first transformer, said first resistor and said tuned circuit which includes said first winding of said first transformer being connected in series across said line circuit, said first resistor and said tuned circuits of said first transformer having a circuit Q predetermined according to the frequency band of said carrier telephone current and said series connection including said first resistor having a high impedance at said carrier frequency to place a relatively small load on said line circuit, said second resistor connected across a second winding of said second transformer and included in said connections between said filter means and said input electrodes of said first stage tube; a gain control voltage channel including another amplifier tube and a rectifier, said other amplifier tube having input and output electrodes and having its output electrodes connected across a load resistor through said rectifier for creating a rectified voltage across said load resistor when carrier frequency energy is applied to the input electrodes of that tube, means including capacitance to couple the output electrodes of said first stage tube to the input electrodes of the tube of said second stage amplifier and to the input electrodes of said other amplifier tube, means including a source of direct voltage connected to the output electrodes of said other amplifier tube to bias that tube and provide a nonlinear characteristic for said gain control voltage channel, circuit means connecting said load resistor to the input electrodes of said second stage tube for controlling the gain of that tube by the rectified voltage created across said load resistor, said second stage tube characterized as a variable mu tube, whereby a substantially constant energy level output is provided over a relatively wide range in the energy level of said carrier telephone current due to the nonlinear characteristics of both the gain control voltage channel and said second stage tube; a loud-speaker, and means including an audio and power-amplifier stage to couple said loud-speaker to said detector.

5. In a two-way carrier telephone intercommunication system including a plurality of stations and a line circuit extending between all stations, an input filter at each station comprising a pair of terminals for connection to said line circuit, a pair of tuned circuits, and a resistor, each of said tuned circuits having a winding and a capacitor tuned to resonance at a given carrier frequency, the two windings being mounted for a selected mutual inductance, said resistor and a first one of said tuned circuits in series connected across said pair of terminals, said resistor and said first tuned circuit having a circuit Q predetermined according to said given carrier frequency modulated by a selected voice frequency band and having a relatively high impedance between said terminals at said given carrier frequency.

6. In a two-way carrier telephone intercommunication system including a group of spaced stations and a line circuit extending between said stations and adapted to transmit a given carrier telephone current, said line circuit having a characteristic impedance of a given order at the frequency of said carrier; an input filter at each of said stations including a pair of tuned circuits and a resistor, each tuned circuit including a winding and a capacitor tuned to resonance at said carrier frequency, the two windings being mounted for a selected mutual inductance, said resistor and a first one of said tuned circuits in series connected across said line circuit for said resistor and said characteristic impedance of said line circuit to be in effect in parallel with said first tuned circuit, said resistor and first tuned circuit having a circuit Q predetermined according to the frequency band of said carrier telephone current and having a relatively high impedance across the line circuit at the carrier frequency, whereby the input filters of all the stations permanently connected across the line circuit are a negligible load at said carrier frequency.

7. In a two-way carrier telephone intercommunication system including a group of spaced stations and a line circuit extending between said stations and adapted to transmit a carrier telephone current of a given carrier frequency, said line circuit having a characteristic impedance of a given order at said given carrier frequency and each said station having a pair of terminals connected across said line circuit; an input filter at each said station, each said input filter including a first and a second transformer and a first and a second resistor, said first transformer having a first and a second winding each of which windings is included with capacitance in a circuit tuned to resonance at said carrier frequency, said second transformer having a first winding which is included with capacitance in a circuit tuned to resonance at said carrier frequency and capacitance coupled to the tuned circuit which includes said second winding of said first transformer, said second transformer also having a second winding across which is connected said second resistor, said first resistor and the tuned circuit which includes said first winding of said first transformer being connected in series across said terminals of that station, said first resistor and said tuned circuits of said first transformer having a circuit Q predetermined according to the frequency band of said carrier telephone current with the resistance of said first resistor relatively high, whereby said input filter of each station is permanently connected across said line circuit with negligible loss to said carrier telephone current.

8. In a two-way carrier telephone intercommunication system including a group of spaced stations and a line circuit extending between said stations and adapted to transmit a given carrier telephone current, said line circuit having a characteristic impedance of a given order at the frequency of said carrier and each said station having a pair of terminals connected across said line circuit; an input filter at each said station including a resistor and at least a pair of tuned circuits each having capacitance and tuned to resonance at the frequency of said carrier, each said filter arranged with said resistor and a first one of said tuned circuits in series connected across said pair of terminals of that station, said resistor and said tuned circuits having a circuit Q selected according to the frequency band of said carrier telephone current and said resistor and said first tuned circuit in series having a high impedance at said carrier frequency to place a relatively small load on said line circuit whereby each input filter is permanently connected across said line circuit with a negligible loss of voltage of the carrier telephone current.

9. In a two-way carrier telephone intercommunication system including a group of spaced stations and a line circuit extending between said stations and adapted to transmit a carrier telephone current of a given carrier frequency, said line circuit having a characteristic impedance of a given order at said carrier frequency; an input filter at each of said stations, each said input filter including a first and a second transformer and a first and a second resistor, said first transformer having a first and a second winding each of which windings is included with capacitance in a circuit tuned to resonance at said carrier frequency, said second transformer having a first and a second winding, said first winding being included with capacitance in a circuit tuned to resonance at said carrier frequency and capacitance coupled to the tuned circuit including said second winding of said first transformer, said first resistor and the tuned circuit including said first winding of said first transformer being connected in series across said line circuit for said first resistor and said characteristic impedance of said line circuit to be in effect in parallel with the tuned circuit including said first winding of said first transformer, said second resistor connected across said second winding of said second transformer, said first resistor and said tuned circuits of said first transformer having a circuit Q predetermined according to the frequency band of said carrier telephone current with the series impedance of said first resistor and the tuned circuit including said first winding of said first transformer being high at said carrier frequency to place a negligible load on said line circuit, whereby each input filter is permanently connected across said line circuit with a negligible loss of voltage of said carrier telephone current.

References Cited in the file of this patent

UNITED STATES PATENTS

| | | |
|---|---|---|
| Re. 21,014 | Beers | Feb. 28, 1939 |
| 1,967,768 | Farnham | July 24, 1934 |
| 2,205,738 | Wheeler | June 25, 1940 |
| 2,226,739 | Percival | Dec. 31, 1940 |
| 2,232,864 | O'Neill et al. | Feb. 25, 1941 |
| 2,259,595 | Vreeland | Oct. 21, 1941 |
| 2,632,812 | Cooney | Mar. 24, 1953 |